US007885763B2

(12) United States Patent
Havens

(10) Patent No.: US 7,885,763 B2
(45) Date of Patent: Feb. 8, 2011

(54) APPARATUS AND METHODS FOR TRACKING MOVEMENT OF PERSONS

(75) Inventor: William H. Havens, Syracuse, NY (US)

(73) Assignee: Hand Held Products, Inc., Skaneateles Falls, NY (US)

(*) Notice: Subject to any disclaimer, the term of this patent is extended or adjusted under 35 U.S.C. 154(b) by 1103 days.

(21) Appl. No.: 11/565,881

(22) Filed: Dec. 1, 2006

(65) Prior Publication Data
US 2008/0133127 A1 Jun. 5, 2008

(51) Int. Cl.
G08B 29/00 (2006.01)
(52) U.S. Cl. ...................... 701/207; 348/169
(58) Field of Classification Search .......... 701/207; 340/505, 539.1, 539.11–539.15, 539.22–539.26, 340/825.71; 348/169, 135, 143, 208.14; 455/39, 41.2, 500
See application file for complete search history.

(56) References Cited
U.S. PATENT DOCUMENTS 6,427,913 B1 * 8/2002 Maloney ...................... 235/383
6,970,088 B2 * 11/2005 Kovach ...................... 340/572.1
7,030,732 B2 4/2006 Tuttle
7,098,793 B2 8/2006 Chung
7,103,087 B2 9/2006 Eastburn
7,492,262 B2 * 2/2009 Washington ............... 340/572.1
7,633,392 B2 * 12/2009 Neuwirth .................. 340/572.1
2006/0202804 A1 9/2006 Vijay-Pillai et al.

* cited by examiner

Primary Examiner—Dalena Tran
(74) Attorney, Agent, or Firm—Hiscock & Barclay, LLP

(57) ABSTRACT

A system and method for tracking movements of an object of interest using an contact or contactless tag, having a writable memory. A plurality of scanners are dispersed throughout an environment in which movement of the object is to be tracked, wherein when a scanner detects the tag an entry is added to the tag. The entry can include a variety of data including, for example, the location entry indicating a time the tag was detected and a location of the detection. The system and method are particularly, but not exclusively, suited for use with airline travel.

27 Claims, 3 Drawing Sheets

APPARATUS AND METHODS FOR TRACKING MOVEMENT OF PERSONS

BACKGROUND OF THE INVENTION

There are a variety of environments through which persons and objects pass in a controlled manner, such as airports, train stations, entertainment parks, prisons, and hospitals. Airline travel can be a complicated and daunting task for most, but for certain individuals, such as children traveling alone, persons traveling with pets, and individuals with a diminished mental or physical capacity, even the task of navigating the terminal and getting onto a plane is fraught with problems. Airports and airlines have an interest in recording information detailing such individual's whereabouts and interactions as they progress through the departure terminal, one or more planes, any intermediary terminals, and finally arriving at their destination. It may also prove valuable to provide associated non-traveling individuals, such as parents, grand-parents, and medical personal, with access to information regarding the traveling individual.

Accordingly, the present Inventors have recognized a need for apparatus and methods to log an individual's, pet's or object's interaction with and movement through a defined environment.

BRIEF DESCRIPTION OF THE DRAWINGS

An understanding of the present invention can be gained from the following detailed description of embodiments of the invention, taken in conjunction with the accompanying drawings of which.

DETAILED DESCRIPTION

Figure 1:
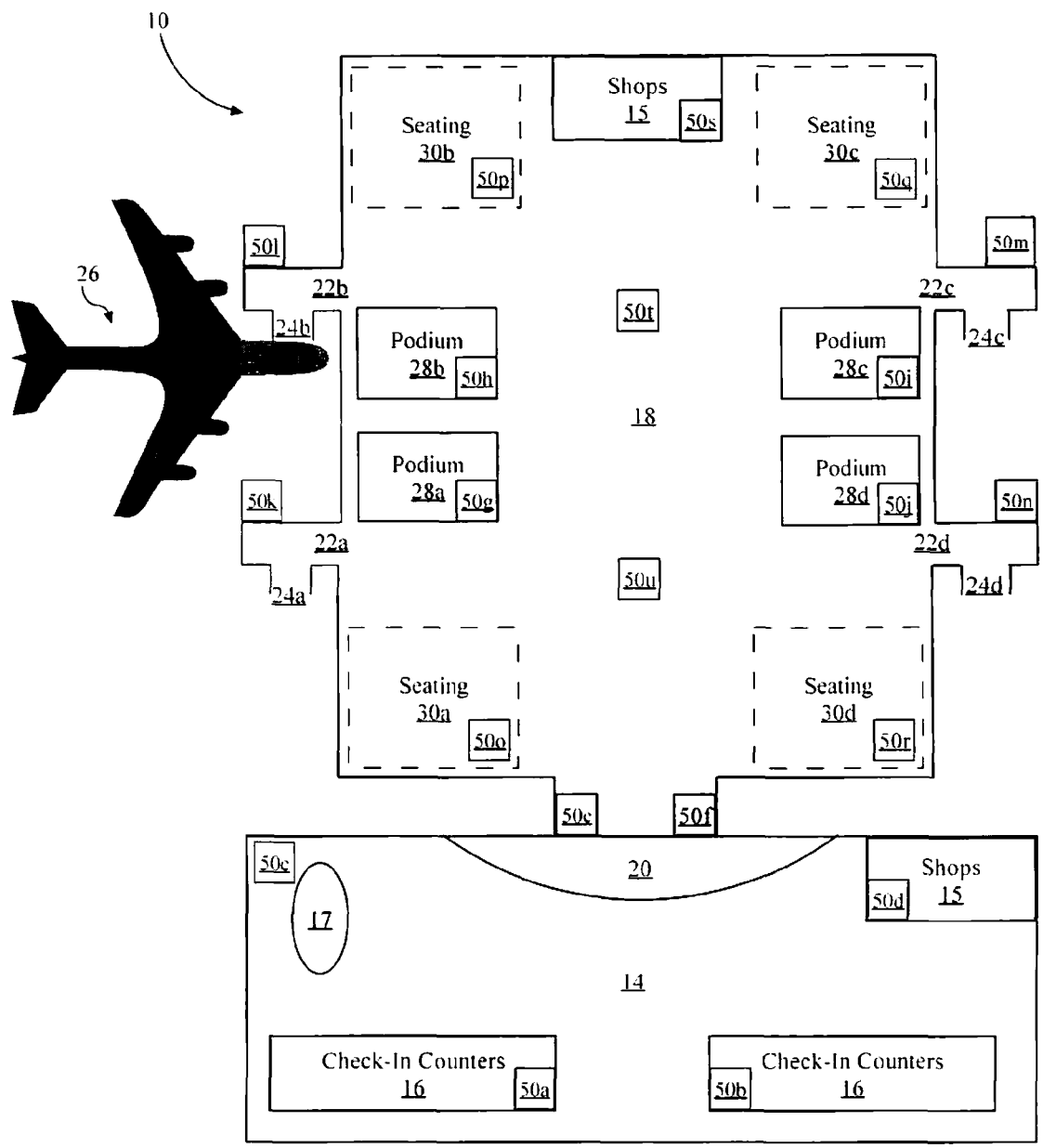
FIG. 1 is a representation of an airport in which apparatus and methods in accordance with certain embodiments of the present invention may be practiced.

Reference will now be made in detail to the present invention, examples of which are illustrated in the accompanying drawings, wherein like reference numerals refer to like elements throughout. The following description will use nomenclature associated with radio frequency identification (RFID) tags, however those of ordinary skill in the art will recognize that the present invention is applicable to a variety of contactless and contact based data storing devices including, electronic tags, wireless IC tags, contact-less ICs, contact-less IC labels, contact-less IC tags, and NFC (Near Field Communication) tags. It is also anticipated that industries other than the airline industry would benefit from the present invention, such as the rental car and train industries.

A method is a sequence of steps or actions leading to a desired result and, in the context of the described embodiments, may be implemented as a combination of hardware and software. While it may prove convenient to discuss the software as if were embodied by a single program, most implementations will distribute the described functions among discrete (and some not so discrete) pieces of software. These pieces are often described using such terms of art as "programs," "objects," "functions," "subroutines," "libraries," ".dlls," "APIs," and "procedures." While one or more of these terms may find favor in the present description, there is no intention to limit the invention to the described configurations.

With respect to the software described herein, those of ordinary skill in the art will recognize that there exist a variety of platforms and languages for creating software for performing the methods outlined herein. Embodiments of the present invention can be implemented using MICROSOFT VISUAL STUDIO or any number of varieties of C. However, those of ordinary skill in the art also recognize that the choice of the exact platform and language is often dictated by the specifics of the actual system constructed, such that what may work for one type of system may not be efficient on another system. It should also be understood that the methods described herein are not limited to being executed as software on a processor or DSP (Digital Signal Processor), but can also be implemented in a hardware processor. For example, the methods could be implemented with HDL (Hardware Design Language) in an ASIC.

In the present description, an element number followed by a letter generally indicates multiple occurrences of similar, either in structure or function, elements. Further, the use of an italicized "n" (e.g. n) associated with an element number generally denotes either an unspecified one of such elements or a partial or complete group of such elements—the meaning of which is to be drawn from the context of such use.

FIG. 1 is a representation of an airport 10 in which apparatus and methods in accordance with certain embodiments of the present invention may be practiced. The airport 10 includes various areas of a typical airport such as a main terminal area 14 which typically includes a check-in counters 16, baggage carousels 17, and shops 15. The airport 10 further includes at least one terminal concourse area 18 entered by passing through a security check point 20. The terminal concourse area 18 includes multiple gate doors $22n$ controlling access to jetways $24n$ which, in turn, define a path into airplanes $26n$. The terminal area 18 typically includes podiums $28n$ where airline personnel are located. The terminal area 18 also includes multiple seating areas $30n$ which may be grouped off by gate. The terminal area may also include additional shops 15.

Generally, a passenger will first register at the check-in counters 16. The check-in may be automated using a kiosk or manual using the services of a clerk. After this, the passenger will pass through security gate 20 to enter the concourse 18. At the security check point, the passenger will, at a minimum, go through a metal detector. However, other security measures may be visited upon the unfortunate passenger. Assuming that the passenger is allowed past the check point, he or she will proceed to a seating area $30n$ near a gate $22n$ associated with their aircraft $26n$ to await boarding. Prior to or after passing the check point 20, the passenger may deviate from the normal path to visit a variety of interim destinations, including restrooms, restaurants, and shops.

For some passengers and/or their guardians it may prove valuable to track their progress through the airport 10. The embodiments of the present invention described herein use an RFID tag provided to the traveler—perhaps when the traveler is issued a ticket at check-in (either curb side or at the counter). The tag may be integrated into the ticket or boarding pass or provided as a separate device—such as a wristband or necklace. A plurality of RFID scanners $50n$ may be located throughout the airport to interact with the RFID tag.

The RFID tag may be initially encoded with identification information including: name; address; birthday; phone number; parents name; check-in date and time; travel itinerary; check-in agent; check-in location; image of traveler; biometric data; etc. . . . As the traveler progresses through his travel itinerary, scanners will sense the tag and write event data (including a time and location of the interaction) to the tag. By scanning for and writing event data to the RFID tag, the traveler's progress may be tracked and a travel log created. By storing the information on the RFID tag, reliance upon external servers and the availability of communication mediums can be minimized. This can serve to increase the reliability and accuracy of the travel log, as airline travel, by definition, spans at least two airports (and sometimes more) making synchronization of the data a concern where storage thereof is maintained on a remote system(s).

RFID tags facilitate the implementation of automatic identification methods by storing and allowing the remote retrieval of data. An RFID tag is an object that can be attached to or incorporated into a product, animal, or person for the purpose of receiving, storing, and transferring information using radio waves. In the context of the presently described embodiments, an RFID system offers the potential advantage that reading and writing thereto is a non-intrusive operation. The tag need only be brought into proximity with a RFID base station for a read/write operation to take place. In the context of a minor or other incapacitated passenger, this means that an agent bearing a hand held RFID base station need simply approach and stand in close proximity to the tag without otherwise disturbing the passenger.

RFID tags may be divided into two groups: passive and active. Passive tags require no internal power source, whereas active tags require a power source. In passive RFID tags, the minute electrical current induced in the antenna by the incoming radio frequency signal provides just enough power for the CMOS integrated circuit in the tag to power up and operate. Unlike passive RFID tags, active RFID tags have their own internal power source which is used to power any ICs that generate the outgoing signal. Active tags are typically much more reliable (e.g. fewer errors) than passive tags due to the ability for active tags to conduct a "session" with a reader.

The described embodiments of the present invention benefit from RFID tags that can accept and store data during use. The TEXAS INSTRUMENTS passive Tag-it HF-I Transponder IC can store 2 Kbits of user addressable data. In comparison, active RFID tags, such as the ActiveWave wristband Tag offer 256 Kbits of user addressable data. As such, active tags may be preferable to passive tags. However, depending on how the data to be stored is coded, current generation passive tags may be sufficient. It is anticipated that future generations of passive tags will have increasing capacities that may satisfy the storage requirements of even the most verbose coding schemes.

Figure 2:
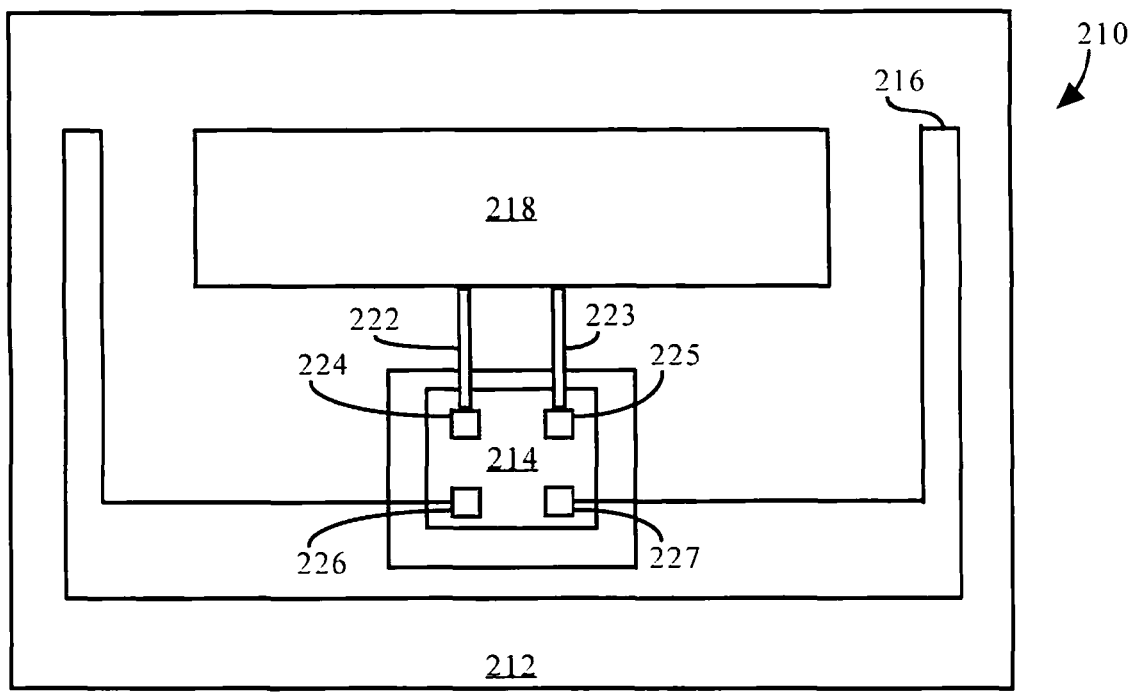
FIG. 2 is a block diagram of an RFID tag that may be used pith embodiments of the present invention.

FIG. 2 is a block diagram of an active RFID tag 210 that may be used with embodiments of the present invention. In particular, the illustrated RFID tag corresponds to the disclosure of United States Patent Publication 2006/0202804—incorporated herein by reference. To ensure a complete disclosure, a synopsis of the description the RFID tag described therein is provided. It should be appreciated, however, that the present invention is not limited to RFID tags much less the particular tag illustrated in FIG. 2. The drawing and description thereof are merely provided to illustrate one example suitable for use with the described embodiments of the present invention.

FIG. 2 illustrates a plan view of a thin, flexible RFID tag 210. The RFID tag 210 includes an integrated circuit 214 mounted on a substrate 212. A scanner initiates communication with the RFID tag 210 by emitting an RF interrogating field. In between periods of communication with the interrogator, the scanner must listen for the presence of an interrogating field As known in the art, the integrated circuit 214 includes RF receive/transmit circuits, signal processing logic, and memory. The integrated circuit 214 is connected to an antenna 216 disposed on the substrate 212 through contacts 226, 227. A thin battery 218 is connected to the integrated circuit 214 by leads 222, 223 bonded at contacts 224, 225, respectively. The RFID tag 210 may be kept thin by placing the battery 218 adjacent to the integrated circuit 214 on the substrate 212 rather than stacking the elements. The antenna 216 may also be disposed adjacent to the integrated circuit 214 without stacking. The battery 218 may have a flat form factor with a thickness of about 0.25 mm enabling it to have a flexible structure. The substrate 212 may be comprised of a flexible material, such as polyimide or polyester. The battery 218 may be attached to the substrate 212 using known techniques, such as soldering, conducting adhesive, spot welding and wire bonding. The integrated circuit 214 may also be attached to the substrate 212 using known techniques, such as thermo-compression bonding used in tape automated bonding (TAB) technology, wire bonding, or flip-chip die attach.

Figure 3:
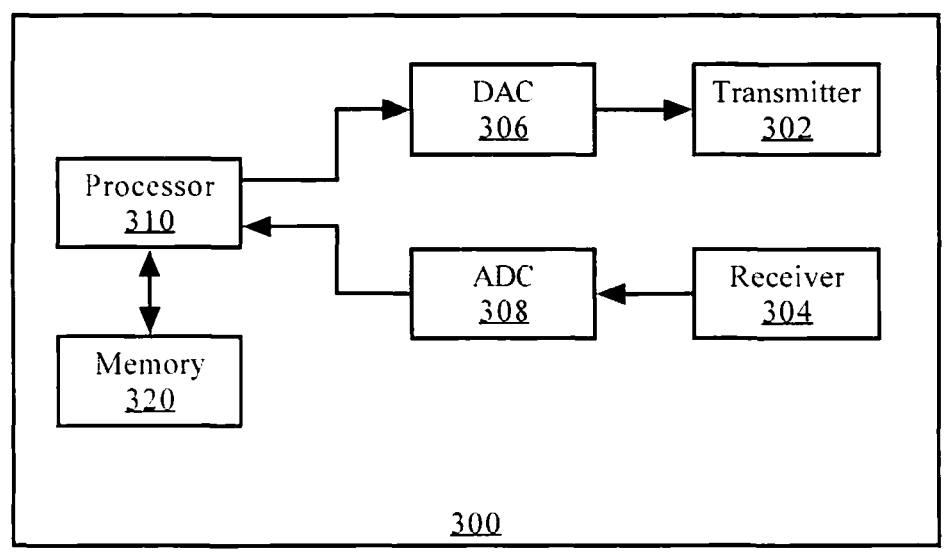
FIG. 3 is a block diagram of an RFID base station suitable for use with embodiments of the present invention.

FIG. 3 is a block diagram of a RFID base station 300. In particular the illustrated RFID base station corresponds to the disclosure of U.S. Pat. No. 7,103,087—incorporated herein by reference. To ensure a complete disclosure a synopsis of the description the RFID base station described therein is provided. It should be appreciated, however, that the present invention is not limited to RFID base stations much less the particular station illustrated in FIG. 3. The drawing and description thereof are merely provided to illustrate one example suitable for use with the described embodiments of the present invention.

The base station 300 includes a memory device 320 and a processor 310 connected to an RF transmitter 302 and an RF receiver 304 via a digital-to-analog (D/A) converter 306 and an analog-to-digital (A/D) converter 308, respectively. When interrogating the RFID tag, digital signal data (in accordance with information stored in the memory device 320 and information provided by a host application (not shown) is provided by the processor 310, converted into analog signal data by the D/A converter 306, and transmitted to the RFID tag via the transmitter 302 (or more particularly via an antenna connected to the transmitter). Back-scattered data is then received by the receiver 304 (or more particularly the antenna connected to the receiver), converted into digital data by the A/D converter 308, and provided to the processor 310. The processor 310 may be programmed to perform a variety of actions including: storing the data in memory 320; transferring the data to a remote system (e.g. a database server or a web server); or any number of additional processes (e.g. analysis, transformation, display, etc. . . . ).

Figure 4:
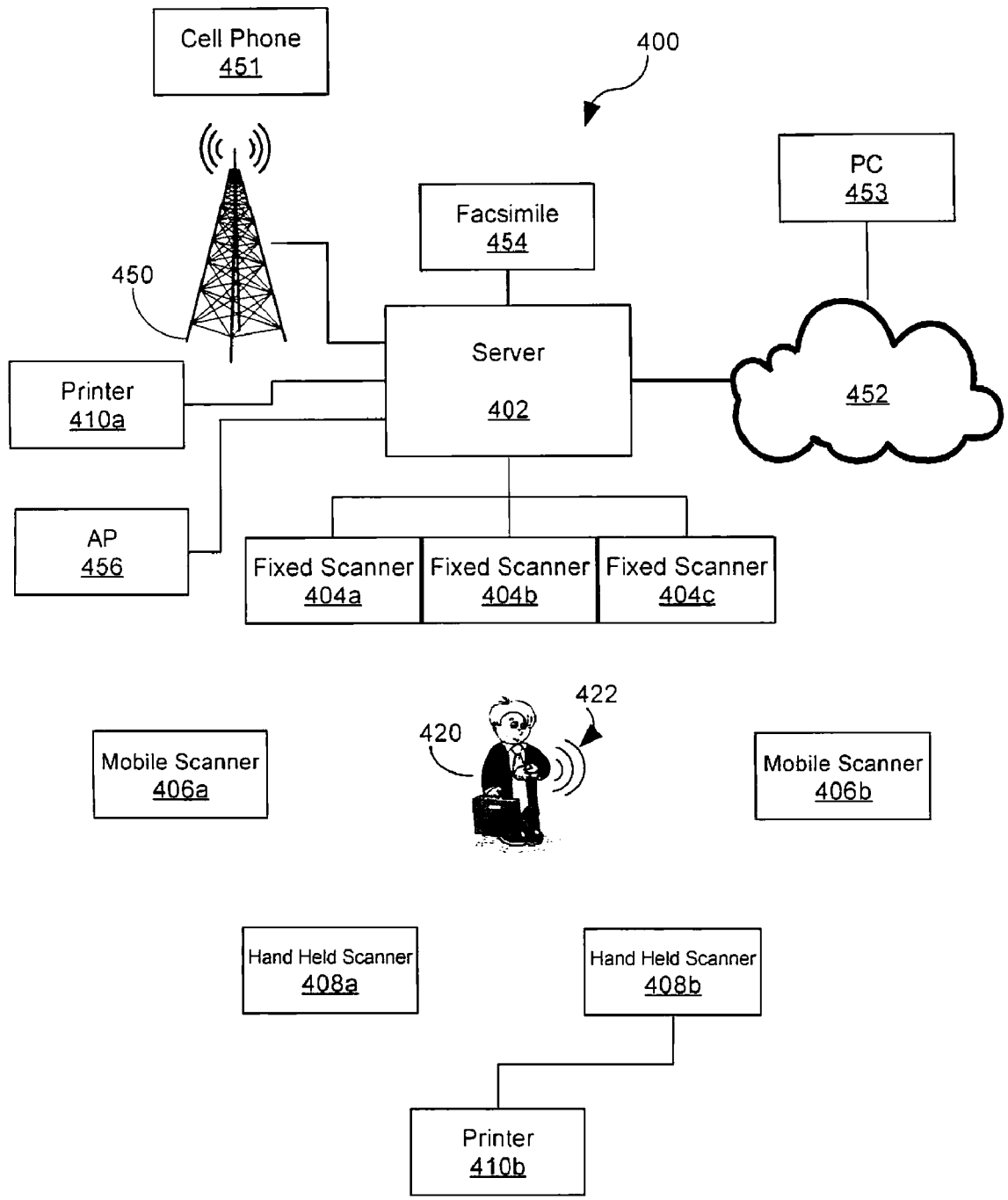
FIG. 4 is a block diagram of a system in accordance with an embodiment of the present invention.

FIG. 4 is a block diagram of a system 400 in accordance with an embodiment of the present invention. The system 400 generally comprises apparatus and methods for tracking and recording the movement of a person, or object 420. The person, or object of interest 420 (to simplify the language used herein, hereinafter referred to as the traveler 420) may, for example, comprise a customer, a passenger, an employee, a prisoner, a pet, baggage or other object to be tracked. As the traveler 420 passes through an environment, such as the airport 10 in FIG. 1, he or she will pass by a plurality of RFID scanners 404n. 406n, and 408n. Generally, RFID scanners may be broken down into three types: fixed; mobile; and handheld.

Fixed RFID scanners, such as the SYMBOL XR400 are, as the name implies, fixed units that generally comprise an antenna and transmit/receive circuitry. These units are generally large in nature and are connected to a computer that controls the operation thereof. In the present embodiments, the scanners 404n represent fixed RFID scanners and may, using the airport example, be located at the check-in counters.

Mobile RFID scanners, such as the SYMBOL RD5000 are smaller units that integrate the antenna, transmit receive circuitry, a control processor (typically programmable), a battery, and communication mediums. Mobile RFID scanners are fully capable of independent operation and additionally are capable of interacting with a remote server to exchange information there between. Mobile RFID scanners may be fixed to movable objects or may be fixed temporarily to immovable objects. In the present embodiments, the scanners 406n represent mobile RFID scanners and may be located throughout the environment. Because of their self contained nature, mobile RFID scanners are suitable for installation almost anywhere including, once again using the example of an airport, mobile carts, mobile board pass apparatus and into any of the various stores and restaurants in the airport.

Handheld RFID scanners, such as the SYMBOL MC9060-G RFID Handheld Reader are portable units that integrate the antenna, transmit receive circuitry, a control processor (typically programmable), a battery, and communication mediums. As with mobile RFID scanners, handheld RFID scanners are fully capable of independent operation and additionally are capable of interacting with a server to exchange information there between. The main advantage of handheld RFID scanners over mobile RFID scanners is their portability. Following through with the airport example, airline and airport employees may be provided with handheld RFID scanners 408n.

The RFID scanners 408n, 406n and 404n may be connected to a server 402 in a variety of manners, including an 802.11 network via access points 456; any number of wired connections; cellular connection (e.g. GPRS) via a cellular tower 450; or any of a number of alternative communication mediums. Each RFID scanner that senses the RFID tag 422 associated with the traveler 420 will place a travel log record onto the RFID tag 422 and may provide the server 402 with a record of the interaction.

The travel log record may include a data/time stamp; along with an indication of the location of the interaction. For fixed and stationary mobile units, the indication need be nothing more than an identification of the scanner. For non-stationary mobile units and hand held units, the location may be derived through known methods including GPS, aGPS, triangulation using available transmission sources (e.g. 802.11 wireless access points 456 and cell towers 450).

Additional data may be added to the RFID tag 422 depending on the use environment and the available memory space. For example, when the traveler passes the security check point 20, additional notations maybe entered into the RFID tag 422 describing the results of the security investigation, including the risk level assessment, whether any items were confiscated, what additional measures where used to assess the risk level and the identity of the security personnel that performed the investigation.

It may also prove preferable to include a description, either textually or via a pre-defined code, of the nearest point of interest in the airport. The description of the location of the interaction can be determined from one or more lookup tables using the device ID or location data as determined by the device. TABLE 1 illustrates a possible data format with several example entries:

TABLE 1

| Date and Time | Device ID | Location | Operator |
| --- | --- | --- | --- |
| 10262006/14:32 | 404a | Check-in Counter 12 | 1003454 |
| 10262006/14:45 | 406a | Security Gate A | 0023451 |
| 10262006/15:01 | 406b | HUDSON NEWS 23 | 0023451 |
| 10262006/15:17 | 408a | Men's Room in terminal A | 0873098 |

As the traveler 420 progresses from his or her departure terminal to the destination terminal, and any interim destinations, the travel log on the traveler's RFID tag 422 is continually updated by the RFID scanners located through out the facilities. Similarly, corresponding entries may be added to a database associated with the server(s) 402. Where the scanners are able to send their entries to the server, a message can be produced that details the progress of the traveler 420 throughout the facilities. The message can be provided to interested partied in a number of manners including: as a text or voice message to a cell phone 451; as a facsimile message via facsimile machine 454; as an e-mail or IM sent to PC 453 via the Internet 425; a web page retrievable by the PC 453 (perhaps using a secured connection) from the Internet 452; or simply printed out on printer 410a. Further, many of the scanners, such as hand held RFID scanner 408b maybe associated with a portable printer, e.g. printer 410b. This permits airline or airport employees to print a travel log at any time at any location in which the scanner can communicate with the server 402. Where the traveler 420 is a child, this facilitates a process wherein the child is handed off to a guardian with a copy of the travel log. It may also prove beneficial to provide an electronic copy of the report, for example on a USB FLASH drive.

Although some embodiments of the present invention have been shown and described, it will be appreciated by those skilled in the art that changes may be made in these embodiments without departing from the principles and spirit of the invention, the scope of which is defined in the claims and their equivalents. For example, as noted, the RFID tag 422 can store a traveler's identification data including photos, physical description, and a vast array of biometric data including finger, voice, and eye prints. Such data can be used to verify the traveler at any point in his or her voyage.

Using the example of a tracking a child throughout a voyage, the gate attendant at the destination terminal scans the child's RFID tag, adds an entry and retrieves the identification data, or a pointer thereto, which may be used to verify the identity of the child. Alternatively (or additionally) the RFID tag can store identification information of the guardian meeting the child at the destination airport. As above, the identification information may comprise: photos, physical description, and a vast array of biometric data including finger, voice, and eye prints. This data can be used to verify the identity of the receiving party prior to transferring guardianship of the child.

Another example of a modification within the scope of the present invention is to enhance security by write protecting the travel log entries after being written to the RFID tag. Yet another example of a modification within the scope of the present invention is to enhance privacy by deactivating the RFID tag upon exiting the destination airport. Deactivation may be accomplished by having appropriately programmed scanner(s) located at exit points of an airport.

What is claimed is:

1. A system for tracking movements of a first person being escorted to a second person, the system comprising:

a storage device, having a writable memory for storing identification information associated with both the first person and the second person; and a plurality of scanners dispersed throughout a region in which movement of the first person is to be tracked, wherein when a first scanner detects the storage device a location entry is added to the storage device, the location entry indicating a time the storage device was detected and a location of the detection and wherein the identification information of the second person is used to verify the identity of the second person at a destination location.

2. A system, as set forth in claim 1, wherein the plurality of scanners includes fixed and mobile scanners.

3. A system, as set forth in claim 1, wherein the storage device is integrated with a travel related document.

4. A system, as set forth in claim 1, wherein the storage device is affixed to the first person.

5. A system, as set forth in claim 1, wherein the location entry is a travel depot.

6. A system, as set forth in claim 5, wherein the travel depot is an airport.

7. A system as set forth in claim 1, wherein the location entry and the destination location comprises at least two airports.

8. A system, as set forth in claim 1, wherein the location entry and the destination location comprises an amusement park.

9. A system, as set forth in claim 1, wherein the location entry and the destination location comprises a hospital.

10. A system, as set forth in claim 1, wherein the location entry and the destination location comprises a prison.

11. A system, as set forth in claim 1, further comprising:
a printer associated with a scanner, the printer printing a travel log of the first person, the travel log including an indication of each location entry recorded in the storage device.

12. A system, as set forth in claim 1, wherein the storage device comprises one of: an RFID tag.

13. A system, as set forth in claim 1, wherein the location entry comprises a time and an identifier of the scanner detecting the storage device.

14. A system, as set forth in claim 1, wherein the location entry additionally comprises at least one of a date, an agent identification, a flight number, a baggage identification string, and a security status.

15. A system, as set forth in claim 1, wherein the identification information comprises at least one of the following: photo; physical description; fingerprint; voice print; and eye print.

16. A system to report the movement of a traveler, the system comprising:
an RFID tag carried by the traveler, the RFID having a writable memory for storing identification information associated with the traveler and a second person;
a plurality of RFID scanners dispersed along a path followed by the traveler, each RFID scanner configured to detect the proximity of the RFID tag and if a detection occurs, storing an indication on the RFID tag of the detection; and
reporting system for providing, based upon the indications stored in the RFID tag, a description of interactions between the RFID tag and each RFID scanner that detected the proximity of the RFID tag including verification of the identity of the traveler at an entry location and verification of the identity of the second person at a destination location.

17. A system, as set forth in claim 16, wherein the RFID tag is a bracelet.

18. A system, as set forth in claim 16, wherein the RFID tag is incorporated into a boarding pass.

19. A system, as set forth in claim 16, wherein the RFID tag is incorporated into a ticket.

20. A system, as set forth in claim 16, wherein at least one RFID scanner is a hand held scanner.

21. A system, as set forth in claim 16, wherein the reporting system comprises:
an RFID scanner that reads the indications stored on the RFID tag; and
a printer that outputs a report based on the indications read by the RFID scanner.

22. A method for tracking a traveler, the method comprising:
associating an RFID tag with the traveler;
placing a plurality of RFID scanners;
when the traveler comes into proximity with an RFID scanner at an entry location, storing on the RFID tag a record indicating the identity of the RFID scanner, the identity of the traveler and the time at which the traveler came into proximity with the RFID scanner; and,
when the traveler comes into proximity with an RFID scanner at a destination location, storing on the RFID tag a record indicating the identity of the RFID scanner, the identity of a person meeting the traveler and the time at which the traveler came into proximity with the RFID scanner.

23. A method, as set forth in claim 22, wherein the identification information comprises at least one of the following: photo; physical description; fingerprint; voice print; and eye print.

24. A method for tracking an airline traveler, the method comprising:
placing a plurality of RFID scanners around a first and second airport:
associating an RFID tag with the traveler when the traveler checks in at the first airport: and
as the traveler progresses from the first airport to the second airport, when the traveler comes into proximity with an RFID scanner, storing on the RFID tag a record indicating the identity of the RFID scanner, the identity of the traveler and the time at which the traveler came into proximity with the RFID scanner and when the traveler comes into proximity with an RFID scanner at a destination location, storing on the RFID tag a record indicating the identity of the RFID scanner, the identity of a person meeting the traveler and the time at which the traveler came into proximity with the RFID scanner.

25. A method, as set forth in claim 24, further comprising: outputting a report based upon the records in the RFID tag.

26. A method, as set forth in claim 25, wherein the step of outputting comprises: creating a web site based upon the records in the RFID tag.

27. A method, as set forth in claim 25, wherein the step of outputting comprises:
reading the records in the RFID tag; and
printing a report.

* * * * *